United States Patent [19]

Capitoli

[11] Patent Number: 5,193,831
[45] Date of Patent: Mar. 16, 1993

[54] BICYCLE POWERED GO-CART

[76] Inventor: Christopher A. Capitoli, 315 North Oak Ave., Clifton Heights, Pa. 19018

[21] Appl. No.: 779,350
[22] Filed: Oct. 18, 1991
[51] Int. Cl.⁵ .................. B62K 5/08; B62K 13/00
[52] U.S. Cl. .................. 280/202; 280/7.16; 280/282
[58] Field of Search ............... 280/202, 203, 204, 209, 280/7.16, 282, 33.991, 47.11, 7.15, 7.17

[56] References Cited

U.S. PATENT DOCUMENTS

| | | | |
|---|---|---|---|
| 526,775 | 10/1894 | Foster | 280/202 |
| 609,237 | 8/1898 | Monnot | 280/202 |
| 895,753 | 8/1908 | Hedstrom | 280/7.16 |
| 1,288,809 | 12/1918 | Benson | 280/7.17 |
| 1,427,417 | 8/1922 | Rickey | 280/202 |
| 1,428,736 | 9/1922 | Wojcicki | 280/202 |
| 1,465,435 | 8/1923 | Higgins | 280/202 X |
| 1,506,565 | 8/1924 | Clatworthy | 280/7.15 |
| 1,562,367 | 11/1925 | Sanders | 280/7.17 |
| 1,661,257 | 3/1928 | Kirch | 280/202 |
| 1,962,013 | 6/1934 | Griffoul | 280/202 |
| 2,482,585 | 9/1949 | Hauptman | 280/202 |
| 3,092,362 | 6/1963 | Walsh | 280/7.16 X |
| 3,713,671 | 1/1973 | Boyer | 280/202 |
| 4,546,992 | 10/1985 | Swartz et al. | 280/282 |
| 4,767,130 | 8/1988 | Fu-Chao | 280/202 |
| 4,770,431 | 9/1988 | Kulik | 280/202 |
| 4,830,388 | 5/1989 | Wang | 280/202 |
| 5,011,169 | 4/1991 | Henderson et al. | 280/202 |

FOREIGN PATENT DOCUMENTS 866788  9/1941  France ............... 280/7.16

Primary Examiner—Margaret A. Focarino
Assistant Examiner—Kevin Hurley
Attorney, Agent, or Firm—Woodcock Washburn Kurtz Mackiewicz & Norris

[57] ABSTRACT

A recreational vehicle for transporting at least two riders comprising (i) a propulsion device adapted for use by a first rider and having a brake and (ii) a go-cart adapted for use by a second rider and having steering device attached thereto, whereby the first rider provides propulsion and braking for the vehicle and the second rider provides steering for the vehicle. In a preferred embodiment, the propulsion device is the rear portion of a conventional bicycle. The go-cart has front and rear compartments, with the front compartment adapted for use by a forward facing rider and the rear compartment adapted for use by a rearward facing rider.

12 Claims, 2 Drawing Sheets

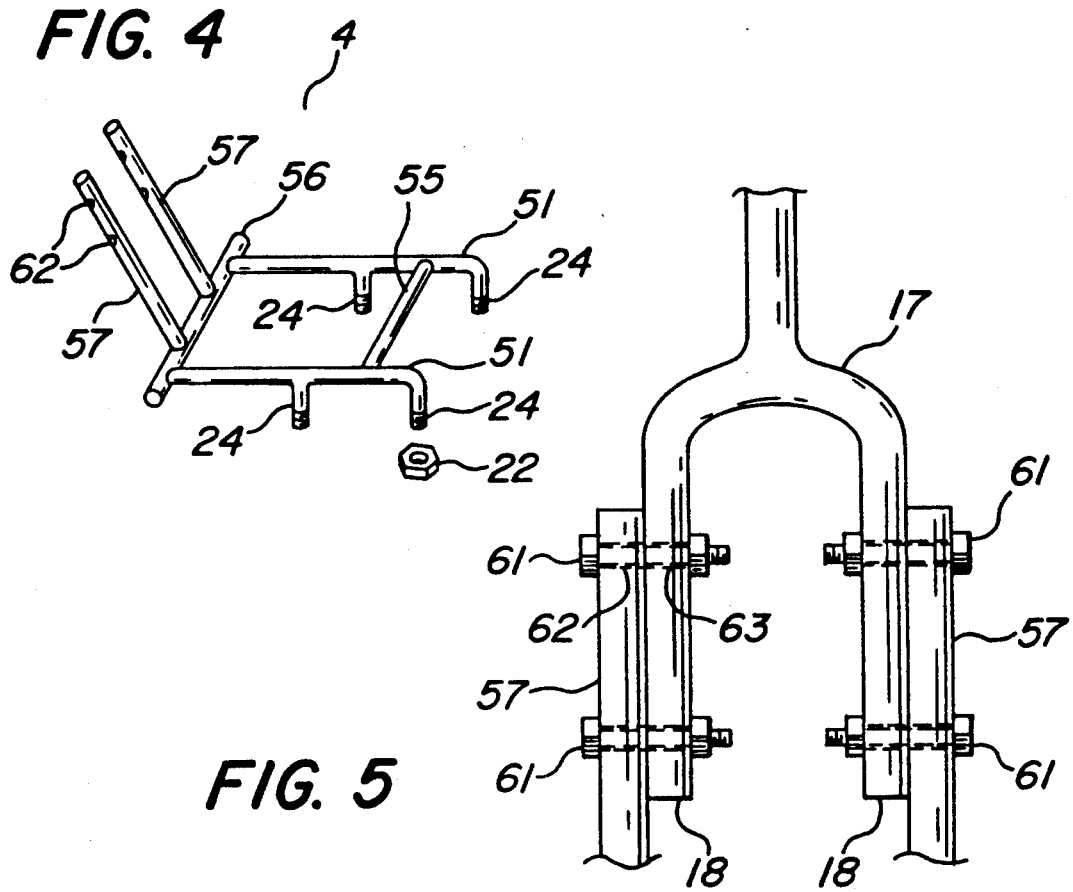
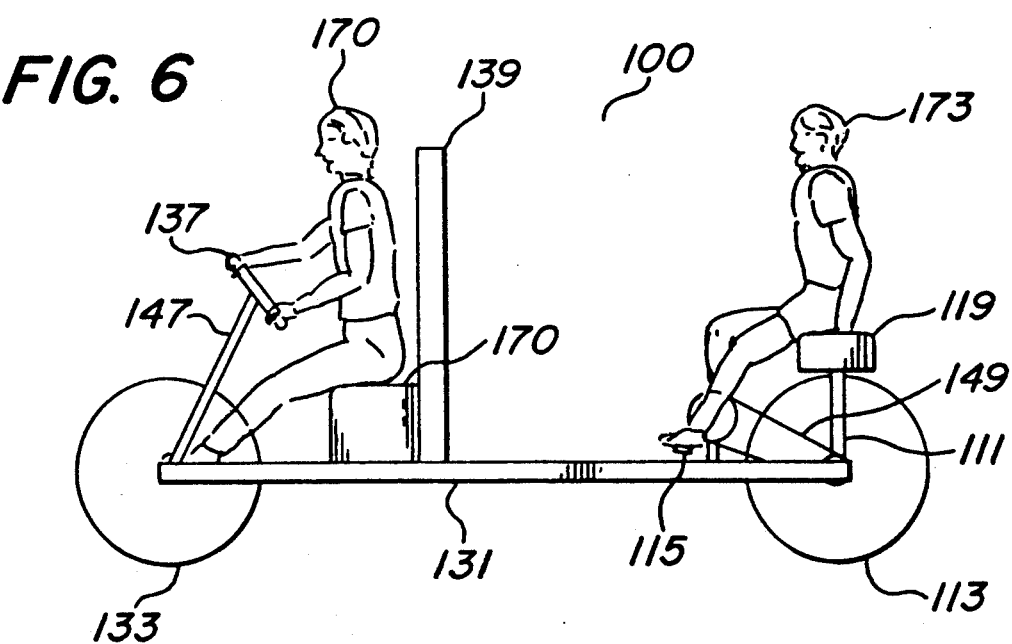

BICYCLE POWERED GO-CART

FIELD OF THE INVENTION

The present invention relates generally to human powered recreational vehicles. More particularly, the present invention relates to a bicycle-powered go-cart wherein a conventional bicycle, with its front wheel removed, provides propulsion to a go-cart incorporating the steering mechanism for the vehicle.

BACKGROUND OF THE INVENTION

In the past, vehicles such as wheel chairs and baby carriages have been joined to the rear portion of a bicycle-like device so that the vehicle could be powered by the rider of the bicycle-like portion—see, for example, U.S. Pat. Nos. 4,830,388 (Wang); 4,770,431 (Kulik); 2,482,585 (Hauptman) and 1,661,257 (Kirch). Such approaches suffer from two disadvantages if applied to provide temporary power for a child's go-cart. First, extensive modification of the bicycle is often required to couple it to the other vehicle. This makes it unsuitable to satisfy the more or less spontaneous desire on the part of an adult and child to power the child's go-cart using the adult's bike on a given day while, allowing both devices to be converted back to independent use on short notice—that is, it is unlikely that the adult will undertake the effort required to couple his/her bicycle to the child's go-cart to "go for a ride" if substantial effort is required to couple the bicycle to the go-cart before the ride and then additional substantial effort is required immediately thereafter so that the bicycle and go-cart remain available for independent use.

The second disadvantage associated with the approaches disclosed in the aforementioned patents, when applied to recreational use with a go-cart, is that the passenger in the vehicle has a passive role since the rider of the bicycle provides both the power and the steering for the vehicle. While this approach may be desireable, or even necessary, with respect to the handicapped and infant occupants of the wheel chairs and baby carriages of the prior art vehicles, it is unsuitable for use in go-carts with active young child who are easily bored with passivity.

Consequently, it would be desirable to provide a recreational vehicle that could be easily formed by temporarily integrating a conventional bicycle with a go-cart and that allowed the occupant of the go-cart to take an active role in operating the vehicle.

SUMMARY OF THE INVENTION

It is an object of the current invention to provide a vehicle that can be easily formed by temporarily integrating a conventional bicycle with a go-cart.

It is another object of the current invention that the vehicle allow the occupant of the go-cart to take an active role in operating the vehicle.

These and other objects are accomplished in a recreational vehicle for transporting at least two riders comprising (i) a propulsion device adapted for use by a first one of the riders and having a frame to which at least one wheel, a pedalling mechanism for driving the wheel, and a seat are attached, (ii) a cart adapted for use by a second one of the riders and having at least one wheel having a steering mechanism coupled thereto, and (iii) means for coupling the propulsion device to the cart, whereby the first rider provides propulsion for the vehicle and the second rider provides steering for the vehicle.

In one embodiment of the invention, the propulsion device has a front fork, and the coupling means is mounted on the cart and adapted to engage the front fork. In this embodiment, the coupling means comprises (i) a base portion attached to the cart, (ii) two connection bars extending upward from the base portion at an acute angle, and (ii) means for attaching the front fork to the connection bars.

BRIEF DESCRIPTION OF THE DRAWINGS

FIG. 4 is an isometric view of the adapter shown in FIG. 1.

FIG. 5 is a detailed view of the front fork portion of the bicycle coupled to the adapter shown in FIG. 4.

FIG. 6 is a side elevation of an alternate embodiment of the vehicle shown in FIG. 1.

DETAILED DESCRIPTION OF THE PREFERRED EMBODIMENT

Figure 1:
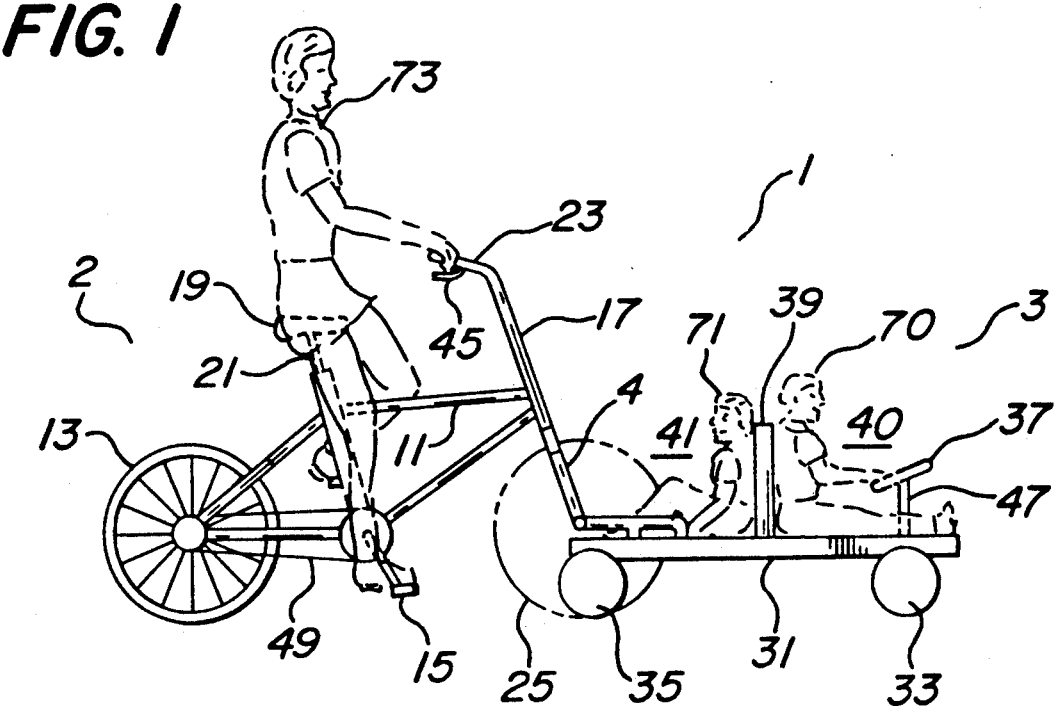
FIG. 1 shows a side elevation view of the vehicle in accordance with the present invention.
Figure 2:
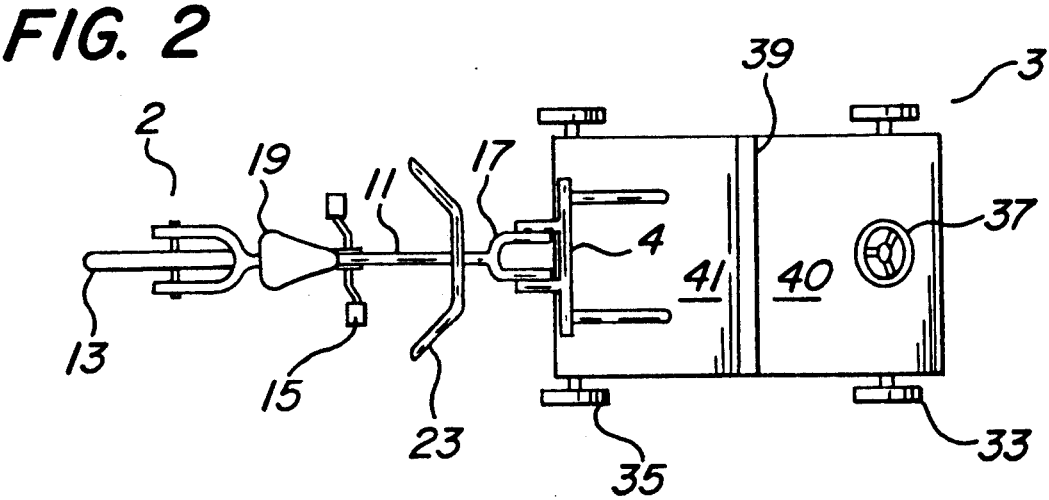
FIG. 2 shows a plan view of the vehicle shown in FIG. 1.
Figure 3:
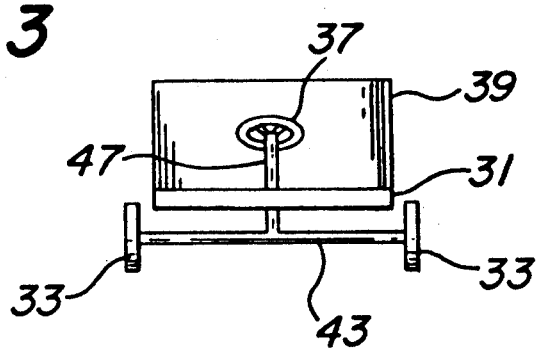
FIG. 3 shows a front elevation view of the go-cart portion of the vehicle shown in FIG. 1.

FIGS. 1-3 show a vehicle according to one embodiment of the current invention. The vehicle 1 is formed by integrating the rear portion of a conventional bicycle 2—that is, a conventional bicycle after its front wheel 25, shown in phantom in FIG. 1, has been removed—to the aft end of a conventional go-cart 3 that has been fitted with an adapter 4. The bicycle 2 has a frame 11 to which a rear wheel 13, a pedalling mechanism 15 adapted to drive the rear wheel via a chain 49, a front fork 27, a seat 59 supported by a seat tube 21, and a handle bar 23 are attached. As is conventional, a hand brake 45, coupled to brake pads (not shown) on the rear wheel 49, is mounted on the handle bar 23 for stopping the bicycle. Alternatively, as is well known in the art, a coaster brake could be incorporated into the rear wheel 49.

As shown in FIGS. 1-3, the go-cart 3 has a substantially horizontal, substantially flat bed or frame 31 on the underside of which front and rear wheels 33 and 35, respectively, are attached. The go-cart 3 has a steering wheel 37 that is coupled by a post 47 to a bar 43 that ties the two front wheels 33 together. Rotation of the steering wheel 37 applies a torque to the bar 43, thereby turning the two front wheels 33. Thus, the steering wheel 37 provides direction control to the go-cart. A wall 39, extending upward approximately perpendicularly from the bed 31, divides the go-cart into front and rear compartments 40 and 41, respectively. Moreover, the wall 39 serves as a back rest for passengers in each compartment, with the passenger 70 in the front compartment 45 facing forward and the passenger 71 in the rear compartment 41 facing rearward. An adapter 4 is mounted on the aft end of the horizontal bed 31 and allows the bicycle 2 to be securely coupled to the go-cart 3.

As shown in FIG. 4, the adapter 4 comprises two mounting bars 51, front and rear support bars 55 and 56, and two spaced connection bars 57. Two threaded members 24 extend downwardly form each of the mounting bars 51. The mounting bars 51 form the base of the adapter 4 and are secured to the horizontal bed 31 by disposing the threaded members 24 through holes in the horizontal bed 31 and clamping the mounting bars to the bed by screwing a nut 22 (only one of which is shown in FIG. 4) onto each threaded member so that the nut bears against the underside of the bed. The support bars 55 and 56 are connected between the two mounting bars 51 and substantially increase the stability of the adapter 4. The connection bars 57 are coupled to the rear support bar 56 and extend upward at an acute angle from the adapter base so that the front fork 17 of the bicycle can be easily aligned for connection.

As shown in FIG. 5, in the preferred embodiment, the connection bars 17 are spaced so one bar is disposed adjacent each of the tines 18 of the front fork 17. This allows the bicycle front fork 17 to be securely attached to the connection bars 57 by four bolts 61 disposed through holes 62 and 63 in the connection bars 57 and the tines 18 of the fork 17, respectively. Thus, according to the current invention, once the adapter 4 has been permanently attached to the bed 31 of the go-cart 3 and the holes 63 have been drilled in the fork 17, the bicycle 2 can be coupled thereto to form the vehicle 1 by merely removing the front wheel 25 of the bicycle, aligning its front fork 17 with the connection bars 57 and installing the bolts 61. It is expected that, unlike the aforementioned previously known approaches to coupling bicycles to vehicles, this operation can be accomplished in a few minutes even by those with little mechanical aptitude.

Although in the embodiment shown in FIGS. 1–3, the front wheel 25 of the bicycle 2 is removed prior to coupling the bicycle to the go-cart 3, the invention could also be practiced by leaving the front wheel installed when the bicycle is coupled to the go-cart. This approach is facilitated by setting the engagement between the front fork 17 and the connection bars 57 so that the front wheel 25 was raised above the ground so as not to interfere with the contact of the go-cart 3 rear wheels 35 of with the ground.

In operation, the rider 73 on the bicycle portion 2 of the vehicle 1 provides power, braking and speed control, while the rider 70 in the front compartment 40 of the gocart 3 provides steering. Thus, unlike the previous approaches, the go-cart front passenger 70 takes an active role in operating the vehicle 1, thereby significantly increasing the enjoyment obtained by children using the vehicle. In addition, the rear compartment 41 may be used for storage or for carrying another passenger 71. According to the current invention, although the passenger 71 in the rear compartment 41 plays a passive role in the operation of the vehicle, by facing rearward such passenger may readily communicate with the bicycle rider 73, thereby preventing boredom.

Although in FIGS. 1–3 the invention has been illustrated by reference to temporarily incorporating a conventional stand-alone bicycle 2 and a conventional standalone go-cart 3 to form a vehicle 1, the invention may also be practiced by providing a vehicle 100 having a unitary structure, as shown in FIG. 6. In this embodiment, the vehicle 100 is comprised of a substantially flat, substantially horizontal frame 131. The frame 131 is of unitary construction—that is, there are no detachable joints within the frame. Attached to the frame 131 are (i) at least one front wheel 133, (ii) at least one rear wheel 113, (iii) a front seat 170, (iii) a wall 139 that serves as a back rest for the front seat, and (iv) a frame 111 that supports a rear seat 119. A pedalling mechanism 115 is coupled only to the rear wheel 113 via drive chain 149, thereby allowing only the rear rider 173 to propel the vehicle 100. A steering wheel 37 is coupled to the front wheel 133, thereby allowing the front rider 170 to steer the vehicle 100.

While the present invention has been illustrated and described in connection with a preferred embodiment, it is not to be limited to the particular structure shown. It is to be understood that various changes and modifications may be made within the purview of the appended claims without departing from the scope and spirit of the invention in its broader aspects.

What is claimed:

1. A recreational vehicle for transporting at least two riders comprising:
   a) a propulsion device adapted for use by a first one of said riders and having a frame to which (i) at least one wheel, (ii) a pedalling mechanism for driving said wheel, (iii) a seat, and (iv) a front fork are attached;
   b) a cart adapted for use by a second one of said riders and having at lest one wheel having a steering mechanism coupled thereto; and
   c) means for coupling said propulsion device to said cart, said coupling means being mounted on said cart and adapted to engage said front fork, whereby said first rider provides propulsion for said vehicle and said second rider provides steering for said vehicle.

2. The vehicle as recited in claim 1, wherein said coupling means comprises:
   a) a base portion attached to said cart;
   b) two connection bars extending upward from said base portion at an acute angle; and
   c) means for attaching said first fork to said connection bars.

3. The vehicle as recited in claim 2, wherein said base portion of said coupling means comprises at least two mounting bars.

4. The vehicle as recited in claim 3, wherein said cart further comprises a substantially horizontal bed portion, and wherein said mounting bars are attached to said bed portion.

5. The vehicle as recited in claim 2, wherein said attaching means comprises a bolt extending through said front fork and connection bars.

6. A recreational vehicle for transporting at least two riders comprising:
   a) a propulsion device adapted for use by a first one of said riders and having a frame to which at least one wheel, a pedalling mechanism for driving said wheel, and a seat are attached;
   b) a cart adapted for use by a second one of said riders and having at least one wheel having a steering mechanism coupled thereto, said cart to which said steering mechanism is coupled forming a front wheel for said cart, and wherein said cart further comprises a rear wheel; and
   c) means for coupling said propulsion device to said cart, whereby said first rider provides propulsion for said vehicle and said second rider provides steering for said vehicle.

7. The vehicle as recited in claim 6, wherein said steering mechanism comprises a post operatively coupling a steering wheel to said front wheel.

8. A vehicle for transporting at least two riders comprising:
   a) a rear portion of a conventional bicycle adapted for use by a first one of said riders and having a frame to which (i) a rear wheel, (ii) a pedalling mechanism for driving said rear wheel, (iii) a front fork, (iv) a seat, and (v) brake are attached;

b) a cart adapted for use in front of said rear bicycle portion and having (i) at least one front wheel having a steering mechanism operatively coupled thereto by a post, (ii) at least two rear wheels, and (iii) front and rear compartments, said front compartment adapted for use by a second one of said riders; and c) an adapter mounted on said cart and having means for being coupled to said front fork, whereby said first rider provides propulsion and braking for said vehicle and said second rider provides steering for said vehicle.

9. The vehicle as recited in claim 8, wherein said coupling means comprises:

a) at least two mounting bars adapted to provide a base portion for said coupling means and attached to said cart; and b) first and second spaced connection bars extending upward from said base portion at an acute angle.

10. The vehicle as recited in claim 9, wherein:

a) said front fork comprises first and second spaced tines; and b) said first and second connection bars are spaced so that said first connection bar is disposed adjacent said first tine and said second connection bar is disposed adjacent said second tine.

11. The vehicle as recited in claim 10, wherein said coupling means further comprises a bolt extending through at least said first tine and said first connection bar.

12. The vehicle as recited in claim 8, wherein said front compartment is adapted for use by said second rider in a forward facing position and said rear compartment is adapted for use by a third rider in a rearward facing position, whereby said first and third riders face each other in use.

* * * * *